US006641939B1

(12) United States Patent
Lee et al.

(10) Patent No.: US 6,641,939 B1
(45) Date of Patent: Nov. 4, 2003

(54) TRANSITION METAL OXIDE DOPED ALUMINA AND METHODS OF MAKING AND USING

(75) Inventors: Cheng-Tsin Lee, Union City, CA (US); Randel F. Mercer, San Mateo, CA (US)

(73) Assignee: The Morgan Crucible Company PLC (GB)

( * ) Notice: Subject to any disclaimer, the term of this patent is extended or adjusted under 35 U.S.C. 154(b) by 0 days.

(21) Appl. No.: 09/346,472

(22) Filed: Jul. 1, 1999

Related U.S. Application Data

(60) Provisional application No. 60/091,447, filed on Jul. 1, 1998, and provisional application No. 60/109,481, filed on Nov. 23, 1998.

(51) Int. Cl.⁷ .................................................. B32B 9/00
(52) U.S. Cl. .................. 428/701; 428/702; 428/699; 428/210; 501/134; 501/153; 279/128; 106/286.4; 106/286.5; 106/286.6; 106/286.8; 106/287.17; 106/287.19; 106/287.23
(58) Field of Search ................................. 501/134, 153; 428/701, 702, 699, 210; 279/128; 106/287.17, 286.8, 286.1, 286.5, 286.6, 286.4, 287.18, 287.19, 287.23

(56) References Cited

U.S. PATENT DOCUMENTS

| | | |
|---|---|---|
| 2,879,184 A | 3/1959 | Coghill |
| 2,897,424 A | 7/1959 | Waring |
| 3,650,815 A | 3/1972 | Ghoshtagore et al. |
| 3,791,861 A | 2/1974 | Sundahl, Jr. |
| 3,844,823 A | 10/1974 | Hofmann et al. |
| 3,918,982 A | 11/1975 | Hart et al. |
| 4,015,048 A | 3/1977 | Martin |

(List continued on next page.)

FOREIGN PATENT DOCUMENTS

| | | |
|---|---|---|
| EP | 0 339 903 | 11/1989 |
| GB | 2234852 | 2/1991 |
| JP | 62212298 | 9/1987 |
| JP | 63274694 | 11/1988 |
| JP | 04141577 | 5/1992 |
| JP | 04225581 | 8/1992 |
| JP | 04295094 | 10/1992 |
| JP | 05102563 | 4/1993 |
| JP | 05186297 | 7/1993 |
| JP | 05275783 | 10/1993 |
| JP | 06104512 | 4/1994 |
| JP | 06171974 | 6/1994 |
| JP | 06305888 | 11/1994 |
| JP | 0812342 | 1/1996 |
| JP | 08048614 | 2/1996 |
| WO | WO 97/38481 | 10/1997 |

OTHER PUBLICATIONS

Yost, et al., "Electrostatic Attraction and Particle Control," *Microcontamination*, pp. 18, 20, 22, 23, 24, 25, 70–(Jun. 1986).

Kingergy, et al., "Introduction to Ceramics," Second Edition, John Wiley & Sons, pp. 866–873 No Date.

Watanabe, et al., "Electrostatic Charge Distribution in the Dielectric Layer of Alumina Electrostatis Chuck," *J. Mat. Sci.*, 29:3510–3516 (1994) No Month.

*Primary Examiner*—Deborah Jones
*Assistant Examiner*—Wendy Boss
(74) *Attorney, Agent, or Firm*—Bruce D. Gray; Dean W. Russell; Kilpatrick Stockton LLP

(57) ABSTRACT

The invention relates to the utilization of doped alumina for static charge sensitive applications, and to methods for making and using the same, e.g., for varying the electrical conductivity of alumina by doping with an appropriate transition metal oxide and subsequently heating to high temperatures in a reducing environment. This treatment allows the electrical conductivity to be tailored and thus provides a cost effective means for producing components with controlled resistivity.

21 Claims, 3 Drawing Sheets

U.S. PATENT DOCUMENTS

| | | |
|---|---|---|
| 4,480,284 A | 10/1984 | Tojo et al. |
| 4,524,091 A | 6/1985 | Blaauw et al. |
| 4,595,649 A | 6/1986 | Ferguson et al. |
| 4,665,463 A | 5/1987 | Ward et al. |
| 4,714,640 A | 12/1987 | Morgan |
| 4,772,346 A | 9/1988 | Anderson, Jr. et al. |
| 4,780,306 A | 10/1988 | Ishii |
| 4,794,048 A | 12/1988 | Oboodi et al. |
| 4,900,712 A | 2/1990 | Bar-Ilan et al. |
| 4,977,357 A | 12/1990 | Shrier |
| 5,064,788 A | 11/1991 | Newkirk et al. |
| 5,104,834 A | 4/1992 | Watanabe et al. |
| 5,112,676 A | 5/1992 | Cot et al. |
| 5,151,845 A | 9/1992 | Watanabe |
| 5,166,856 A | 11/1992 | Liporace et al. |
| 5,207,437 A | 5/1993 | Barnes et al. |
| 5,244,691 A | 9/1993 | Valente et al. |
| 5,356,673 A | 10/1994 | Schmitt et al. |
| 5,384,681 A | 1/1995 | Kitabayashi et al. |
| 5,384,682 A | 1/1995 | Watanabe et al. |
| 5,413,360 A | 5/1995 | Atari et al. |
| 5,431,955 A | 7/1995 | Kawamura et al. |
| 5,463,526 A | 10/1995 | Mundt |
| 5,492,725 A | 2/1996 | Gordon |
| 5,600,530 A | 2/1997 | Smith |
| 5,663,865 A | 9/1997 | Kawada et al. |
| 5,668,524 A | 9/1997 | Aida et al. |
| 5,880,924 A * | 3/1999 | Kumar et al. |

* cited by examiner

TRANSITION METAL OXIDE DOPED ALUMINA AND METHODS OF MAKING AND USING

The present application claims benefit under 35 U.S.C. §119(e) of the filing dates of provisional applications Ser. No. 60/091,447, filed Jul. 1, 1998 and Ser. No. 60/109,481, filed Nov. 23, 1998, the entire contents of each of which are hereby incorporated by reference.

BACKGROUND OF THE INVENTION

1. Field of the Invention

This invention relates to the utilization of doped alumina for static charge sensitive applications, and to methods for making and using the same, e.g., for varying the electrical conductivity of alumina by doping with an appropriate transition metal oxide and subsequently heating to high temperatures in a reducing environment. This treatment allows the electrical conductivity to be tailored and thus provides a cost effective means for producing components with controlled resistivity.

2. Description of Related Art

Ceramics made of alumina are often utilized in various applications because they exhibit a wide variety of desirable properties such as high stiffness, low thermal expansion, chemical inertness, high wear resistance, reasonable strength and low cost. Aluminas are, however, electrical insulators, which makes them poor candidates for applications requiring electrical charge conduction. Electrostatic chuck dielectrics containing alumina and oxides of transition metals, such as titanium, have been suggested (U.S. Pat. No. 5,104,834 Watanabe, et al.; U.S. Pat. No. 5,151,845 Watanabe, et al.; U.S. Pat. No. 5,384,681 Kitabayashi, et al.; U.S. Pat. No. 5,384,682 Watanabe, et al.; U.S. Pat. No. 5,463,526 Mundt; European Pat. No. 0,339,903 Watanabe, et al.). Additionally, controlled resistivity aluminas are described for use in high vacuum, high voltage insulation applications (U.S. D.O.E. Contract DE-AC04-76DP00656, H. C. Miller, 1980).

However, it is believed that the use of controlled resistivity aluminas for the dissipation of electrical charges in ESD sensitive applications has not been previously disclosed. ESD sensitive applications include semiconductor circuit manufacturing, flat panel display manufacturing and magnetic recording head manufacturing. The use of fully insulating materials in these applications is not effective, because fully insulating materials do not allow static charges to be removed. Conversely, highly conductive materials, such as metals, allow the static charges to drain too quickly, potentially damaging sensitive devices with excessive electrical power.

Another area where charge dissipative materials are useful is in materials handling, in particular the handling of bulk materials in particulate form, such as grain production, sugar production, coal production, flour production, and textile production. Handling devices in these applications are often made from electrically conductive materials, such as metals, which may not possess some of the more desirable properties of ceramics, such as wear resistance, hardness, stiffness, or thermal stability.

The use of charge dissipative materials that are not fully insulative is also of value in applications requiring extremely low particulate concentrations in the vicinity of the material, since insulative materials tend to suffer from build up of static charge on their surfaces, which can attract and retain fine particulates. The electrostatic attractive forces between a charged object and a particle can be orders of magnitude larger than gravitational forces or aerodynamic forces, making it extremely difficult to remove fine particulate contamination from a charged surface. It has been shown that a 1 micron particle can generate an 80 kpsi bonding pressure with a surface charged to 1000V (Yost et al., *Microcontamination*, 6/86).

Accordingly, there remains a need in the art for materials having controlled resistivity between that of fully insulating materials and that of good conductors, for use as materials in applications requiring reduced electrostatic discharge damage, minimized charge accumulation, and reduced attraction of particulate contamination.

SUMMARY OF THE INVENTION

In one aspect, the invention relates to an alumina material having a resistivity ranging from about $10^4$ to about $10^{14}$ ohm-cm. In one embodiment of this aspect of the invention, the alumina material comprises alumina that has been doped with one or more transition metal oxides. Typically, such a transition metal oxide doped alumina is fired in a reducing atmosphere during its preparation, and may also be fired in air prior to firing in a reducing atmosphere. In a particular embodiment of this aspect of the invention, the alumina material comprises alumina doped with titania. In a more particular embodiment of this aspect, the titanium oxide doped alumina is fired in a hydrogen atmosphere.

In another aspect, the invention relates to a coating material of controlled resistivity comprising the transition metal oxide doped alumina material dispersed on a substrate material.

In another aspect, the invention relates to an electrostatic charge dissipative material, and to articles made therefrom, comprising the transition metal oxide doped alumina. This material may be in the form of a coating applied to a substrate. The invention also relates to electrostatic charge dissipative articles made from or coated with the transition metal oxide doped alumina material.

In another aspect, the invention relates to a dielectric material comprising the transition metal oxide doped alumina.

In yet another aspect, the invention relates to apparatus for materials handling, and in particular for the handling of particulate materials, that is made from or has surfaces coated with the transition metal oxide doped alumina material described above.

In yet another aspect, the invention relates to a method of preparing the electrostatic charge dissipative ceramic material by combining alumina, one or more transition metal oxides, and, optionally, a sintering aid and a binder to form a mixture, forming the mixture into a green body, and sintering the green body in a reducing atmosphere for a period of time sufficient to provide a desired surface resistivity.

In yet another aspect, the invention relates to a method of dissipating electrostatic charge from a device by forming at least one part of the device from or coating at least one surface of at least one part of the device with a ceramic material comprising alumina doped with at least one transition metal oxide; and electrically connecting the alumina doped with at least one transition metal oxide to a ground or other material of lower electrical potential.

The invention provides an alumina material that has good strength, wear resistance, hardness, stiffness, and thermal stability (e.g., low thermal expansion), that is chemically inert, and that also provides a cost effective means for dissipating electrical charges in static sensitive applications, minimizing the risk of electrostatic discharge, as well as the risk of attracting particulate contamination in ESD and/or particulate sensitive applications, including semiconductor circuit manufacturing, flat panel display (e.g., liquid crystal display) manufacturing, magnetic recording head manufacturing, etc. The use of transition metal oxide doped aluminas allows the resistivity of the material to be controlled, so that when the material is grounded, static charge build up on the material is drained in a slow, controlled manner.

DETAILED DESCRIPTION OF SPECIFIC EMBODIMENTS OF INVENTION

As described above, the invention relates to ceramic materials, articles made from or coated with them, and methods for making them, containing alumina doped with a transition metal oxide. As used herein, the term "transition metal oxide" means an oxide of an element having atomic numbers in the range 21–29, 39–47, 57–79, and 89 or higher. Oxides of titanium, manganese and chromium have been found to be particularly suitable transition metal oxides suitable as dopants according to the invention. When the transition metal oxide is a titanium oxide, it may be anatase or rutile. This doping with transition metal oxide increases the electrical conductivity of the alumina body and the amount of conductivity can be controlled by adjusting process parameters such as dopant concentration, firing time, firing temperature and firing atmosphere.

Figure 1:
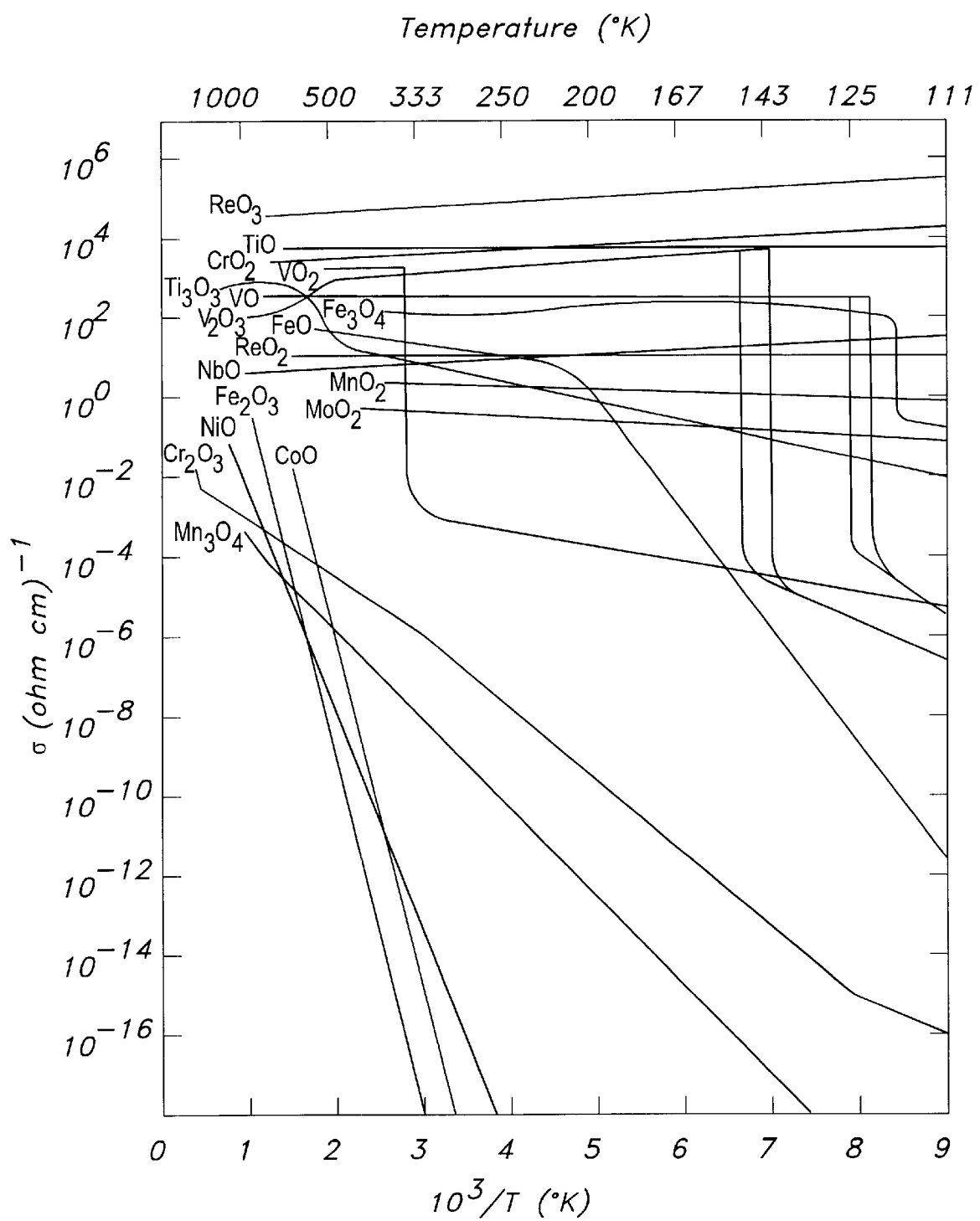
FIG. 1 is a graph showing temperature dependence of the electrical conductivity of several transition metal oxides.

The electrical conductivity of several electronically conducting oxides is shown in FIG. 1 (Additional information in this regard can be obtained by reference to "Introduction to Ceramics" by Kingery, et al., $2^{nd}$ edition, John Wiley and Sons p.867). By adding these conducting oxides to alumina matrix, the overall conductivity of doped alumina is reduced, allowing control of the resistivity of alumina according to the invention. When heat treating $TiO_2$ doped alumina in inert or reducing atmosphere, $TiO_2$ has a tendency to lose oxygen and form $Ti_2O_3$ or $TiO$ which decrease the resistivity of alumina. $TiO$ or $Ti_2O_3$ has a resistivity of $10^{-4}$ and $10^{-1}$ ohm cm, respectively, which is much lower than that of $TiO_2$ (~$10^9$ ohm cm). Equations 1 to 3 below illustrate the reduction of $TiO_2$ to $TiO$ and $Ti_2O_3$ in a hydrogen or CO atmosphere. Increasing the time and temperature of the reduction treatment will move the reaction further to the right and thus increase the conductivity of titania doped alumina.

$$2TiO_2 + H_2 = Ti_2O_3 + H_2O \quad (1)$$

$$Ti_2O_3 + H_2 = 2TiO + H_2O \quad (2)$$

$$2TiO_2 + CO = Ti_2O_3 + CO_2 \quad (3)$$

The titania doped alumina can be densified between about 1450° C. and about 1700° C., more particularly between about 1500° C. to about 1600° C. Sintering time ranges from about one hour to about 17 hours, more particularly between about 2 and about 5 hours. Increasing the time and temperature of sintering will result in higher density but larger grain size which has negative effect on the strength of the ceramics.

Table 1 lists some examples of the effects of sintering temperature, time and atmosphere on the volume resistivity of 4% titania doped alumina. Samples of 1"×1"×0.5" disks were first fired in air to 1600° C. for 2 hours followed by a reduction fire at various temperature and atmosphere. The volume resistivity of doped alumina after air firing is about 10 ohm cm.

TABLE 1

The effects of firing temperature and time on the resistivity of 4% titania doped alumina

| | 1200° C., 2 hrs, 75% $H_2$/25% $N_2$ | 1200° C., 17 hrs, 75% $H_2$/25% $N_2$ | 1530° C., 2 hrs, 75% $H_2$/25% $N_2$ | 1700° C., 2 hrs, Ar |
|---|---|---|---|---|
| Volume Resistivity (ohm cm) | $2 \times 10^{12}$ ohm cm | $5 \times 10^9$ ohm cm | $2 \times 10^9$ ohm cm | $3 \times 10^7$ ohm cm |

Note that the inert gas argon provides a reducing atmosphere in this context because titania will lose oxygen therein.

In addition to minimizing electrostatic discharge damage, controlled resistivity aluminas can be connected to ground to minimize charge accumulation and subsequently reduce the attraction of particulate contamination; it is believed that this application has also not been previously disclosed. Standard insulating aluminas will retain surface charges and will thus attract particulate contamination much more readily than a grounded, controlled resistivity alumina.

The transition metal doped alumina resistivity can be controlled within a range of about $10^4$ to about $10^{14}$ ohm-cm, more particularly about $10^4$ to about $10^{13}$ ohm-cm, even more particularly about $10^6$ to about $10^{12}$ ohm-cm. The transition metal doped alumina of the invention can therefore completely cover the electrostatic dissipative range (as defined by the ESD Association) of $10^4$ ohm-cm to $10^{11}$ ohm-cm. Electrostatic dissipative alumina can thus be utilized in ESD sensitive applications that benefit from other properties of alumina. Exemplary areas of interest include semiconductor circuit manufacturing, flat panel display manufacturing and magnetic recording head manufacturing. Controlled resistivity alumina devices such as robotic end effectors; wafer cassettes, wafer chucks, vacuum wands, tweezer contact pads, storage racks, etc., can be electrostatically connected to ground, thus allowing controlled electrostatic charge dissipation. Additionally, these controlled resistivity, grounded devices remain surface charge neutral, thus minimizing the electrostatic attraction of particulate contamination.

The ceramic materials containing transition metal oxide doped aluminas of the invention typically contain the transition metal oxide dopant in amounts ranging from about 1 to about 10 wt %, more particularly from about 2 to about 8 wt %, even more particularly from about 2.8 to about 8 wt %, calculated as oxide based upon the total weight of the ceramic material. The ceramic material of the invention may also contain other oxides, which typically are present as the result of their addition as sintering additives. These include alkaline earth metal oxides, such as CaO and/or MgO, which are typically present in amounts (and more particularly in a total amount) less than about 1 wt %, calculated as oxide based on the total weight of the ceramic material, and silica, which is typically present in an amount ranging from about 0% to about 3 wt %, more particularly, less than about 1 wt %, also calculated as oxide based on the total weight of the ceramic material.

Exemplary doped alumina samples have been produced with a variety of resistivities ranging from $10^4$ ohm-cm to $10^{14}$ ohm-cm. Additionally, exemplary devices, including robotic wafer end effectors and a wafer vacuum chuck were manufactured from these controlled resistivity aluminas The transition metal oxide doped alumina materials of this invention can be manufactured in the form of components of the devices described above, or can be formed as coatings on substrates of different materials to provide an electrostatic charge dissipative coating on, e.g., semiconductor processing equipment, particulate materials handling equipment, flat screen manufacturing equipment, and any other area where control of electrostatic charge is necessary or desirable. Alternatively, the doped alumina materials of the invention can be used as dielectric materials, and utilized, e.g., to produce the dielectric layer(s) of an electrostatic clamping device. In one particular embodiment, these doped alumina coatings can be utilized to produce the dielectric layer(s) of an electrostatic chunk for clamping semiconductor wafers during processing in such equipment as physical vapor deposition chambers, chemical vapor deposition chambers and etch chambers.

As described herein, an electrostatic charge dissipative alumina ceramic can be made by doping the alumina with one or more transition metal oxides and subsequently firing the resulting material in a reducing atmosphere. In one particular embodiment, the transition metal is titanium and the reducing firing is carried out in hydrogen.

In general terms, the transition metal oxide doped alumina can be prepared by mixing alumina, e.g., powdered alumina, with one or more transition metal oxide powders, such as titania. Any suitable mixing technique can be used, but a ball mill has been found to suitable. Ball milling should be conducted for about 2 to about 20 hours, e.g., about 16 hours, in order to achieve the appropriate particle size distribution. In addition, sintering aids, such as calcia, magnesia, and/or silica can also be mixed with the alumina and the transition metal oxide. Water is also typically added to the mixture in some amount.

For example, the mixture can be formed into a slurry by addition of water. This slurry can be used to coat materials using any appropriate coating technique, such as screen printing, doctor blading, spray coating, spin coating, or dip coating.

Alternatively, the mixture (including mixtures in slurry form) can be formed into a green body in the shape of the desired electrostatic charge dissipative article and fired in a reducing atmosphere. In a particular embodiment of this aspect of the invention, a water-based binder system (e.g., 3% PVA) can be added in the final stages of mixing, and the resulting slurry spray dried into granules, which can then be pressed into the green body and subsequently fired. Typically, such granules will have a particle size of about 10 to about 100 microns.

The green body or coated material can be sintered directly in a hydrogen furnace or can undergo a preliminary heating in a furnace containing an oxygen-containing gas, followed by a reduction firing in a hydrogen furnace. Sintering and reduction are carried out until the desired surface resistivity is obtained. The surface resistivity of the part is a function of the sintering temperature, atmosphere, and concentration of the transition metal oxide.

When a preliminary firing (prior to sintering in a reducing environment), virtually any gas can be used, but oxygen-containing gases, such as $O_2$ or air, are desirably used. This preliminary firing is desirably carried out at a temperature of from about 1450° C. to about 1773° C. for a time period of about 1 to about 10 hours. More particularly, the firing is carried out at a temperature of about 1550° C. for about 3 hours.

EXAMPLE 1

Transition Metal Oxide Doped Alumina Article

Controlled resistivity alumina according to the present invention can be manufactured in the manner described below. First, as starting materials, alumina ($Al_2O_3$) powder and the transition metal oxide powders such as titania ($TiO_2$) and sintering aids such as calcia (CaO), magnesia (MgO), silica ($SiO_2$) are weighed and milled in a ball mill. The slurry is milled for about 16 hours to achieve the proper particle size distribution. A water based binder system containing polyvinyl alcohol (PVA) (3%) is added to the mill jar in the final stage of milling. The slurry is spray dried to form granules with a size of ~10 to 100 microns. The spray dried powder is pressed at around 10,000 psi to form the green body. The pressed green part can be sintered directly in a hydrogen furnace or first sintered in an air furnace followed by a reduction fire in a hydrogen furnace to generate the desired surface resistivity.

Figure 2A:
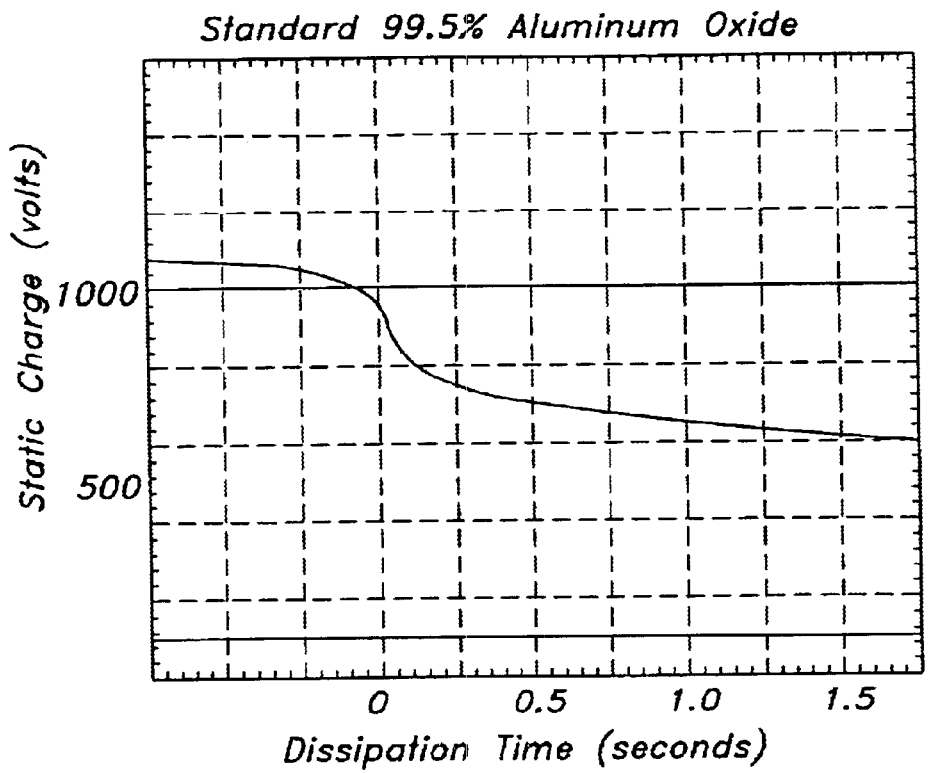
FIG. 2A is a graph showing an oscilloscope trace of the charge dissipation characteristics of a standard pure alumina ceramic material.
Figure 2B:
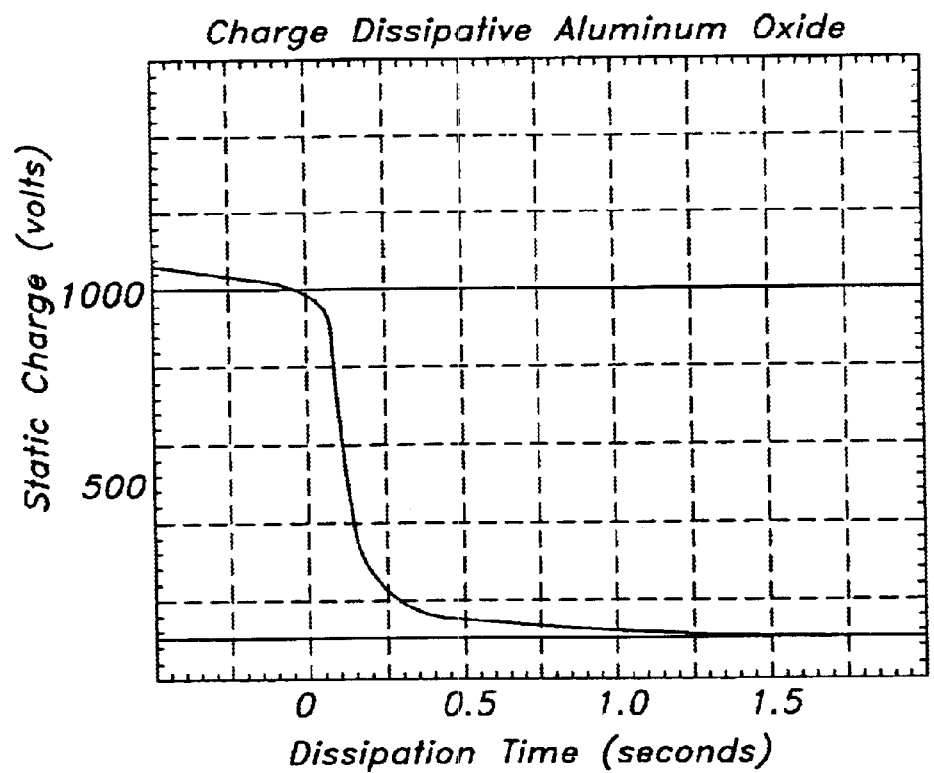
FIG. 2B is a graph showing an oscilloscope trace of the charge dissipation characteristics of a transition metal doped alumina ceramic material of this invention.

Table 2 illustrates the effect of $TiO_2$ concentration on the volume resistivity of controlled resistivity alumina prepared according to this process. Several samples (2"×2"×0.25" disks) of different $TiO_2$ concentration were first sintered in air to 1550 C for 2 hours followed by reducing in the hydrogen environment at 1530 C for two hours. Table 2 also illustrates the static decay time from 5000 volts to 500 volts for doped alumina with various titania contents. The test method used to evaluate the static dissipating performance of the doped aluminas of the invention follows Federal Test Method Standard 101C, method 4046.1 as described in EIA-541, Appendix F, "Measurement of Electrostatic Decay Properties of Dissipative Planar Materials". Typical oscilloscope traces comparing dissipation characteristics of standard undoped alumina with the doped alumina of the invention is shown in FIGS. 2A and 2B. The standard undoped alumina has a tendency to hold the charge for infinite amount of time while the titania doped alumina of the invention will dissipate the charge within a short period of time. The standard undoped alumina was a standard 99.5% pure alumina that contains 0.5% of sintering aid (magnesium silicate) produced by iso-pressing and sintering of spray dried powders. The volume resistivity of the standard 99.5% pure alumina is about $10^{14}$ ohm cm. The titania doped alumina of the invention is a 95% pure alumina that contains 4% titania and ~1% of a sintering aid such as calcia, magnesia and silica. The doped alumina sample was iso-pressed and sintered in air at 1550° C. for 3 hours followed by a reduction treatment at 1530° C. for two hours in hydrogen. The volume resistivity of the titania doped alumina of the invention is about $10^{10}$ ohm cm.

TABLE 2

Effects of $TiO_2$ concentration on the volume resistivity and static decay time of doped alumina

| $TiO_2$ Wt % | 1.3 | 2 | 2.8 | 4 | 8 |
|---|---|---|---|---|---|
| Volume Resistivity (ohm cm) | $8.3 \times 10^{12}$ | $1.2 \times 10^{11}$ | $3.5 \times 10^{10}$ | $2.4 \times 10^9$ | $1.6 \times 10^4$ |
| Static Decay Time (5000 V–500 V) | 1.9 sec. | 1.6 sec | 1 sec. | 0.1 sec. | <0.1 sec. |

Figures 3A, 3B, 3C:
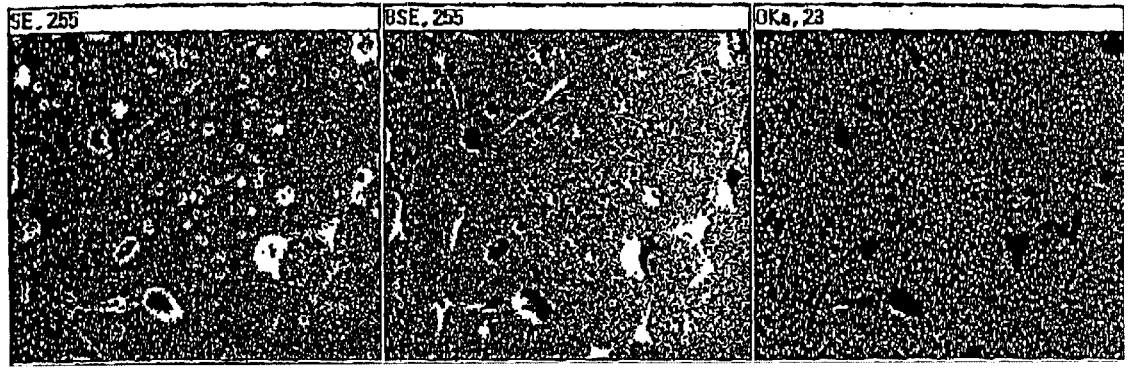
FIGS. 3A, 3B, 3C, 3D, 3E, and 3F are SEM photomicrographs of transition metal doped alumina ceramic materials of this invention.
Figures 3D, 3E, 3F:

Table 3 shows a typical composition of the titania doped alumina. SEM-EDS analysis of the 2 wt % doped alumina is shown in FIG. 3. The sample was spray dried, iso-pressed and sintered in air at 1550° C. for 3 hours followed by a reduction heat treatment in hydrogen at 1530° C. for 2 hours. FIG. 3A is a typical secondary electron image of a 2% titania doped alumina, FIG. 3B is the same image but using back scattered electrons, and FIGS. 3C to 3F are the oxygen, aluminum, boron, and titanium elemental mapping of the same area within the doped alumina. It can be seen that most of the titanium is concentrated in the grain boundary area. Because the solubility of $TiO_2$ in alumina is ~0.3 wt %, the majority of $TiO_2$ will be accumulated in grain boundaries. The continuity of these grain boundary phases, as well as the wetting angle of the titanate liquid phase over alumina grains, is thought to control the resistivity of the doped alumina.

TABLE 3

Composition of a typical controlled resistivity alumina

| Composition | $Al_2O_3$ | $TiO_2$ | $SiO_2$ | CaO | MgO |
|---|---|---|---|---|---|
| Wt % | 97.1% | 2% | 0.3% | 0.1% | 0.5% |

Example 2 Transition metal oxide doped alumina coating

As described above, the alumina and the transition metal oxide dopant can be mixed into a suitable vehicle to form a slurry. The slurry can then be applied to a substrate, such as an electrostatic chuck substrate, using any technique suitable for applying a suspension to the surface of a solid. Examples of such techniques include screen printing, doctor blading, spray coating, spin coating or dip coating.

The coated substrate is then heated to an elevated temperature to remove the slurry vehicle and cause the alumina/dopant mixture to densify. Typically, this heating will include a low temperature heating phase, e.g., below 400° C. to remove volatiles, followed by a high temperature heating phase, e.g. below 1700 C to promote particulate sintering. The high temperature phase may be carried out in a reducing environment to promote reduction of the dopant.

One or more coating layers may be applied. If more than one coating layer is utilized, various layers may have different levels of doping to modify the physical or electrical properties of the dielectric layer.

The substrate material will typically be composed of another ceramic material with a thermal expansion matched to the coating. One particular embodiment (used, e.g., where the coated substrate is an electrostatic chuck) utilizes a densified alumina ceramic with a transition metal dopant level similar to that of the coating. Another particular embodiment utilizes a densified alumina ceramic without dopants; this provides an electrostatic chuck substrate with thermal conductivity superior to that of a doped substrate.

Typically, the electrostatic chuck substrate will be metallized with a conducting electrode pattern prior to coating with the doped alumina slurry. Refractory metals such as molybdenum, manganese and tungsten are common metallization materials. In one particular embodiment, a molybdenum-manganese mixture is used as the metal electrode. In another preferred embodiment, a molybdenum disilicide-manganese mixture is used as the metal electrode.

Several sample 2"×2" electrostatic chucks have been manufactured by the above described techniques. In one example, a molybdenum-manganese mixture was screen printed onto a dense alumina base containing 2% titania dopant. This moly-manganese material was deposited in the form of two rectangular patterns to form the two poles of a bi-polar electrostatic chuck. The metallized, doped alumina substrate was then doctor blade coated with a slurry containing alumina powder and 2% titania. The coated substrate was then dried at low temperature and subsequently fired at 1500° C. in a hydrogen atmosphere. The firing resulted in a dense dielectric coating with electrical properties in the desired range (roughly $10^6$–$10^{13}$ ohm-cm).

Several samples were also produced as described above, except that non-doped, high purity alumina was utilized for the electrostatic chuck substrates. This provided an electrostatic chuck with improved thermal conductivity.

Transition metal oxide doped alumina materials, as described above, can be used to control static charge accumulation in material handling applications. The general method described above for preparing solid part Over 200 parts (1"×1" and greater) have been manufactured by this method with electrical resistivity adjusted to values between $10^4$ ohm-cm to $10^{13}$ ohm-cm.

The invention having been described above, various modifications and equivalents thereof will be apparent to those of skill in the art, and are intended to come within the scope of the appended claims.

What is claimed is:

1. An electrostatic charge dissipative ceramic material comprising alumina doped with a transition metal oxide and containing one or more alkaline earth metal oxides in an amount less than about 1 wt %, calculated as oxide based on the total weight of the ceramic material.

2. An electrostatic charge dissipative ceramic material comprising alumina doped with a transition metal oxide and containing one or more alkaline earth metal oxides in an amount less than about 1 wt %, wherein the transition metal oxide is present in an amount ranging from about 2 to about 8 wt %, calculated as oxide based on the total weight of the ceramic material.

3. An electrostatic charge dissipative ceramic material of claim 2, wherein the transition metal oxide is present in an amount from about 2.8 to about 8 wt %, calculated as oxide based on the total weight of the ceramic material.

4. The electrostatic charge dissipative ceramic material of claim 1, optionally further comprising silica in an amount ranging from 0% to about 3%, calculated as oxide based on the total weight of the ceramic material.

5. An electrostatic charge dissipative ceramic material of claim 1, optionally further comprising silica in an amount less than about 1 wt %, calculated as oxide based on the total weight of the ceramic material.

6. The electrostatic charge dissipative ceramic material of claim 1, wherein the transition metal oxide is titanium dioxide.

7. The electrostatic charge dissipative ceramic material of claim 1, wherein the resistivity of the material is in the range of about $10^4$ to about $10^{14}$ ohm-cm.

8. The electrostatic charge dissipative ceramic material of claim 1, wherein the material is prepared by a process comprising firing in a reducing atmosphere.

9. The electrostatic charge dissipative ceramic material of claim 8, wherein the reducing atmosphere comprises hydrogen.

10. The electrostatic charge dissipative ceramic material of claim 9, wherein the transition metal oxide is titanium dioxide.

11. The electrostatic charge dissipative ceramic material of claim 1, wherein said alumina doped with a transition metal oxide is in the form of a coating on a substrate material.

12. An apparatus comprising at least one component formed from or coated with an electrostatic charge dissipative ceramic material comprising alumina doped with a transition metal oxide and containing one or more alkaline earth metal oxides in an amount less than about 1 wt %, calculated as oxide based on the total weight of ceramic material.

13. The apparatus of claim 12, wherein the transition metal oxide is a titanium oxide.

14. The apparatus of claim 12, wherein the apparatus is suitable for use in manufacturing semiconductor circuits.

15. The apparatus of claim 14, wherein said component is selected from the group consisting of a robotic end effector, a wafer cassette, a wafer chuck, a vacuum wand, a tweezer contact pad, and a storage rack.

16. The apparatus of claim 15, wherein the wafer chuck is a vacuum wafer chuck.

17. The apparatus of claim 12, wherein the apparatus is suitable for handling particulate materials.

18. An apparatus comprising:

at least one component formed from or coated with an electrostatic charge dissipative ceramic material comprising alumina doped with a transition metal oxide and containing one or more alkaline earth metal oxides in an amount less than about 1 wt %, calculated as oxide based on the total weight of ceramic material; and an electrical connection between said component and an object at a lower electrical potential.

19. An apparatus selected from the group consisting of a robotic end effector, a wafer cassette, a wafer chuck, a vacuum wand, a tweezer contact pad, and a storage rack, comprising at least one component formed from or coated with an electrostatic charge dissipative material comprising alumina doped with a transition metal oxide, and one or more alkaline earth metal oxides present in total amount less than about 1 wt %, calculated as oxide based on the total weight of the ceramic material.

20. An apparatus selected from the group consisting of a robotic end effector, a wafer cassette, a wafer chuck, a vacuum wand, a tweezer contact pad, and a storage rack, comprising at least one component formed from or coated with an electrostatic charge dissipative material comprising alumina doped with a transition metal oxide, and silica present in an amount less than about 1 wt %, calculated based on the total weight of the ceramic material.

21. An electrostatic charge dissipative ceramic material comprising alumina doped with a transition metal oxide, and silica present in total amount less than about 1 wt %, calculated based on the total weight of the ceramic material.

\* \* \* \* \*